United States Patent [19]
Gamble et al.

[11] Patent Number: 5,452,735
[45] Date of Patent: Sep. 26, 1995

[54] CONTROL OF TWO STAGE VALVES

[75] Inventors: Jonathan B. Gamble, Chichester, England; Bradley D. Riedle, Clinton Township, Mich.

[73] Assignee: Trinova Limited, Hampshire, England

[21] Appl. No.: 123,320

[22] Filed: Sep. 17, 1993

[30] Foreign Application Priority Data

Sep. 19, 1992 [GB] United Kingdom ............... 9219877

[51] Int. Cl.$^6$ .................................................. F15B 13/043
[52] U.S. Cl. .................... 137/1; 137/625.64; 251/30.01
[58] Field of Search ............................ 137/625.64, 1; 251/129.04, 30.01

[56] References Cited

U.S. PATENT DOCUMENTS 4,907,615  3/1990  Meyer et al. ............... 137/625.64 X
4,938,118  7/1990  Wolfges et al. .............. 137/625.64 X
4,960,365  10/1990  Horiuchi ....................... 137/628.64 X Primary Examiner—Gerald A. Michalsky
Attorney, Agent, or Firm—Barnes, Kisselle, Raisch, Choate, Whittemore & Hulbert

[57] ABSTRACT

A method and apparatus for controlling a two-stage valve using a closed-loop control system, the system including a variable gain element, the method involving continually performing the steps of estimating the flow gain of the pilot stage of the valve; comparing the estimated flow gain with a reference flow gain; and in response to said comparison step, adjusting the gain of the variable gain element to maintain a substantially constant closed-loop gain.

9 Claims, 5 Drawing Sheets

CONTROL OF TWO STAGE VALVES

BACKGROUND OF THE INVENTION

1. Field of the Invention

The present invention relates to a method and apparatus for controlling a two-stage valve.

2. Description of the Prior Art

It is known that when two-stage valves are controlled by traditional techniques the dynamic response of the main stage spool is dependent on the pressure supplied to the pilot stage. This undesirable dependency arises because the flow gain of the pilot stage is approximately proportional to the pilot pressure. One prior solution to this problem is to introduce a pressure regulator between the pilot and main stage valves to maintain a constant pilot stage supply pressure irrespective of the pressure in the rest of the hydraulic system.

It is an object of the present invention to provide a control system for a two-stage valve which is capable of controlling the valve in such a manner that its dynamic response is independent of the pressure supplied to the pilot stage thereof, while avoiding the use of a dedicated pressure regulator, as described in relation to the prior art.

SUMMARY OF THE INVENTION

Accordingly, in a first aspect, the present invention provides a method for controlling a two-stage valve using a closed-loop control system, the system including a variable gain element, the method involving continually performing the steps of estimating the flow gain of the pilot stage of the valve; comparing the estimated flow gain with a reference flow gain; and in response to said comparison step, adjusting the gain of the variable gain element to maintain a substantially constant closed-loop gain.

Preferably, the estimation of the flow gain of the pilot stage of the valve includes the measurement of the positions of the main and pilot spools.

Conveniently, a recursive least squares algorithm, using said measured spool positions as input signals, is used to calculate the estimated flow gain. Preferably, said input signals are prefiltered in order to remove offset errors and high frequency noise.

In a second aspect, the present invention provides apparatus for controlling a two-stage valve, having a pilot stage and a main stage, the apparatus including a variable gain element; means for estimating the flow gain of the pilot stage of the valve; comparison means for comparing the estimated flow gain with a reference flow gain; and adjustment means responsive to the comparison means for adjusting the gain of the variable gain element to nullify the effects of variations in pilot stage supply pressure on the flow gain of the pilot stage.

The comparison means and the adjustment means may be embodied in a reference means forming part of a microprocessor controller for the valve as hereinafter described.

Preferably, the means for estimating the flow gain is responsive to the positions of the main and pilot stage spool positions.

Conveniently, the means for estimating the flow gain is in the form of an estimator, preferably a recursive least squares estimator. The variable gain element may suitably be non-linear.

In the context of the present invention, the term 'estimate' should be construed widely so as to encompass not only instances wherein the estimate is generally equal to the quantity being estimated, but also instances wherein the estimate is merely 'related to' or in some way 'dependent on' the quantity being estimated.

BRIEF DESCRIPTION OF THE DRAWINGS

Exemplary embodiments of the invention are hereinafter described with reference to the accompanying drawings, in which.

DESCRIPTION OF THE PREFERRED EMBODIMENT

Figure 1:
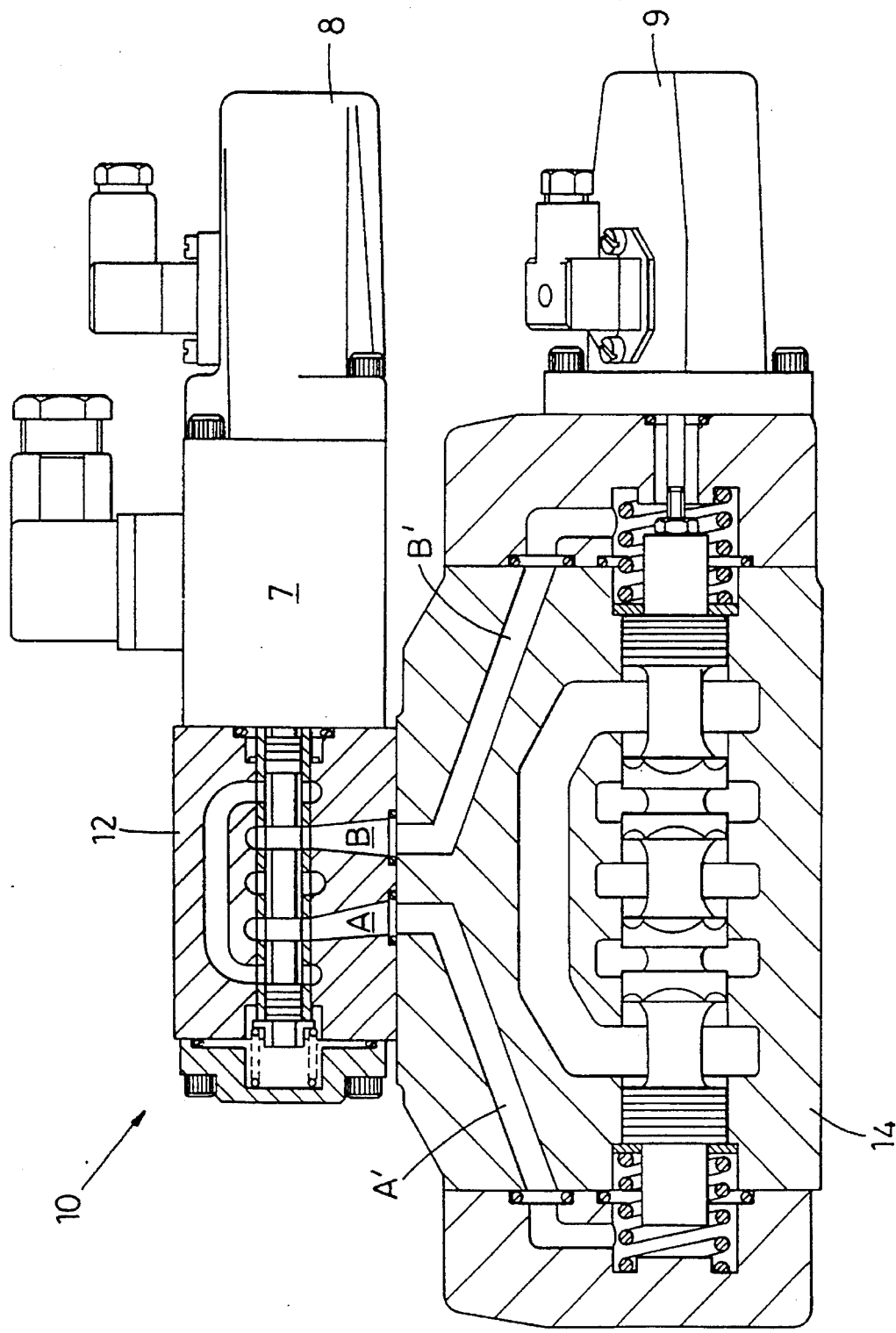
FIG. 1 shows, partly in section a conventional two-stage valve.

Referring to FIG. 1, this shows a conventional two-stage valve 10 comprising a pilot stage 12 and a main stage 14. Control flow Q is supplied to the main stage 14 from the pilot stage through one or other of the pilot service ports A,B and associated drillings ·A' and B' in the main stage. As is conventional in the art, a solenoid 7 is operable to control the position of the spool in the pilot stage and linear variable differential transformers 8,9 are operable to provide measures x,y of the position of the spool in the pilot and main stages 12,14, respectively.

Figure 2:
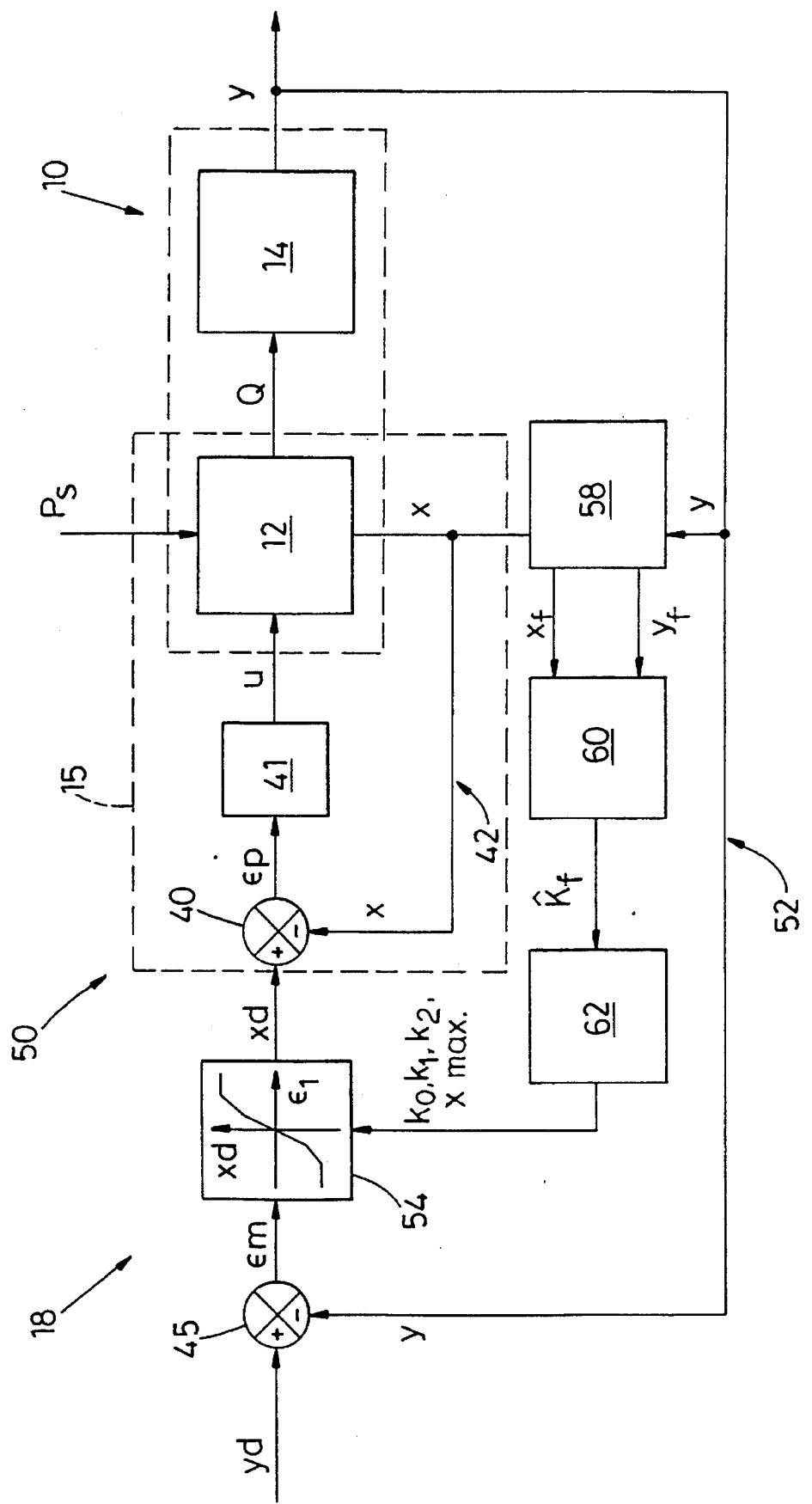
FIG. 2 shows a block diagram of a control system in accordance with the present invention.

Referring to FIG. 2, a closed loop digital control system 50 in accordance with the present invention for controlling the dynamic response of the two-stage valve 10 comprises two nested feedback loops, an inner loop 15 responsive to measured and desired pilot stage spool positions x, xd, respectively, and an outer loop 18 responsive to measured and desired main stage spool positions y, yd, respectively. The inner loop 15 comprises a differencing device 40, responsive to the measured and desired pilot stage spool positions x, xd, and operable to calculate a pilot stage error signal εp which equals xd-x; a controller 41, responsive to the pilot stage error signal εp, and operable to control appropriately the position of the pilot stage spool; and a feedback path 42 operable to feed back the measured pilot stage spool position signal x to the differencing device 40.

The outer loop 18 comprises a differencing device 45, which is responsive to the measured and desired main spool position signals y, yd, respectively, and operable to calculate a main stage error signal εm which equals yd-y; and variable non-linear gain element 54, responsive to the main stage error signal εm, and operable to provide an input signal xd to the inner loop 15. The outer loop 18 further includes the inner loop 15 and the two stage-valve 10 in its forward path, and a feedback path 52 operable to feed back the measured main stage spool position signal y. In addition, an estimator 60, responsive to the measured main and pilot spool position signals x,y, calculates an estimate $\hat{K}_f$ of the flow gain $K_f$. Preferably, and as shown, prefilter means 58 is operable to prefilter the spool position signals, x, y to produce the spool position signals $x_f$, $y_f$ respectively. The function of the prefilter means 58 is to eliminate offset errors and to attenuate any high frequency noise in x and y. The digital low pass filters in the prefilter means 58 may be of the infinite impulse response variety and have the general form:

$$\frac{x_f}{x}(z) = \frac{(1-Z^{-1})(b_0 + b_1 Z^{-1} + b_2 Z^{-2})}{(a_0 + a_1 Z^{-1} + a_2 Z^{-2})}$$

$$\frac{y_f}{y}(z) = \frac{(1-Z^{-1})(b_0 + b_1 Z^{-1} + b_2 Z^{-2})}{(a_0 + a_1 Z^{-1} + a_2 Z^{-2})}$$

the coefficient $a_0$–$a_2$ and $b_0$–$b_2$ being selected in both cases according to well-known design techniques to provide a suitable cut-off frequency. As always, the selection of the cut-off frequency is an engineering compromise between the desire to attenuate unwanted noise and providing sufficient bandwidth for the filter to follow higher frequency variations in x and y.

Z is the normal forward shift operator and $Z^{-1}$ the backward shift operator. Thus it will be appreciated that the provision of the term $(1-Z^{-1})$ in the numerator of filter transfer functions given above effects the removal of the offset errors by 'backward differencing' the input to the filters.

The estimator 60, referred to above, is of the recursive least squares type. This may have the form of $$\hat{K}_f(k) = \hat{K}_f(k-1) +$$

$$\frac{S(k-1)x(k)}{\beta + S(k-1)[x(k)]^2}[y_f(k) - y_f(k-1) - \hat{K}_f(k)x(k)]$$

$$S(k) = \frac{S(k-1)}{\beta} - \frac{[S(k-1)]^2 [x(k)]^2}{\beta^2 + \beta S(k-1)[x(k)]^2}$$

where in accordance with established convention (k) and (k–1) denote the $k^{th}$ and $(k-1)^{th}$ sample, respectively. The variable S is the "covariance gain", and the parameter $\beta$ is the "forgetting factor" which determines how fast the estimator responds to changes in the pilot pressure. Parameter $\beta$ is selected usually on an empirical basis depending on what use the invention is being put. It will be appreciated that the estimator thus compares the velocity of the pilot spool with the acceleration of the main spool.

In other embodiments, a simpler estimator may be employed. For example:

$$\hat{K}_f = \frac{\dot{y}}{\dot{x}}$$

In this equation $\hat{K}_f$ is the estimated flow gain, and x and y are the pilot and main spool positions, respectively. The two main problems associated with this form of estimator are:

(a) Offset errors in the pilot spool position measurement give rise to an estimated gain of zero.

(b) When the pilot spool measurement is zero, the flow gain estimate goes to infinity.

Figure 3:
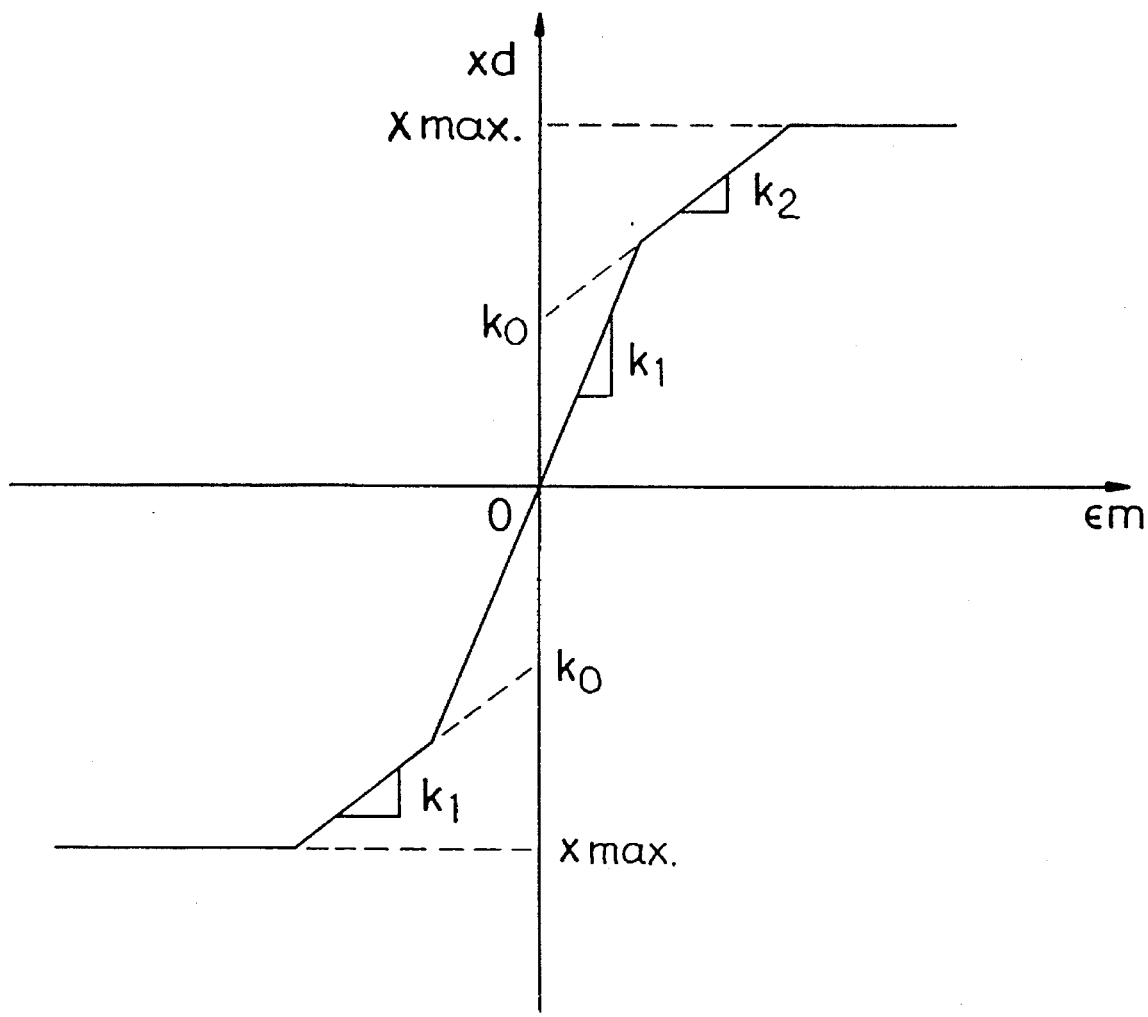
FIG. 3 shows the gain characteristic of the variable non-linear gain element of FIG. 2.

The characteristic gain function of the non-linear variable gain element 54 is shown in FIG. 3, as pilot stage desired spool position versus main stage error signal $\epsilon m$. A reference means 62, which forms part of an overall microprocessor controller for the valve 10, is responsive to the estimated pilot stage flow gain $\hat{K}_f$ and operable to configure or adjust the variable non-linear gain element 54 to the appropriate gain characteristic. It will be noted that, in this preferred embodiment of the invention, the characteristic gain function is defined by 4 selectable parameters, $x_{max}$ a limit, $k_0$ the intercept, $k_1$ a high gain, and $k_2$ a low gain, whereby the overall characteristic of the variable non-linear gain element 54 may be suitably adjusted to compensate for the dependence of the pilot stage flow gain $K_f$ spool position x on the pilot stage supply pressure $P_s$.

Figure 4:
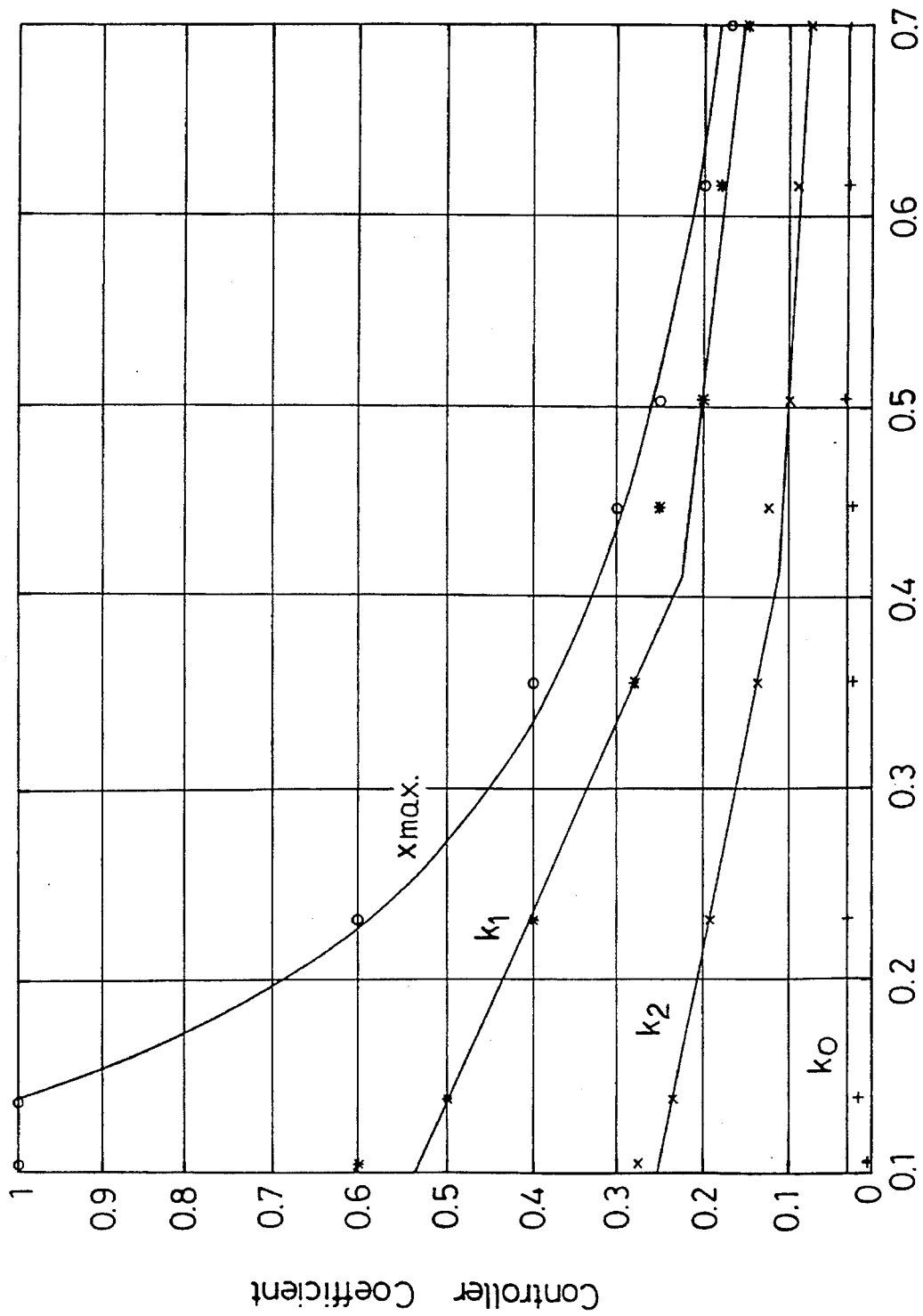
FIG. 4 shows graphically an example of the variation of the non-linear gain element control parameters plotted against estimated gain.

In setting up a given system, the relationship between the estimated flow gain and the pilot stage supply pressure is derived empirically by manually tuning the variable non-linear gain element 54 at various values of pilot stage supply pressure $P_s$, and storing the resulting flow gain and gain element control parameters in the reference means 62, the resulting flow gain and non-linear gain element control parameters thereby constituting reference data. An example set of results for such a procedure is shown graphically in FIG. 4. In operation, the main stage error $\epsilon m$ is scaled by non-linear gain element 54 such that the overall closed loop gain of the system remains constant. As the pilot supply pressure varies, the gain characteristic of the non-linear gain element 54 is adjusted by the reference means 62, which is responsive to the estimated pilot stage gain $\hat{K}_f$, and operable to use the previously derived reference data to reconfigure or adjust the gain characteristic of the variable non-linear gain element 54 to eliminate substantially the effect of said variation and thereby achieve an improved dynamic response. Thus the reference means 62 acts not only as the source of reference flow gains but also as the comparator to compare estimated flow gain with a reference flow gain, and the adjustment means by which the variable gain element 54 is reconfigured as a result of the comparison.

Figure 5:
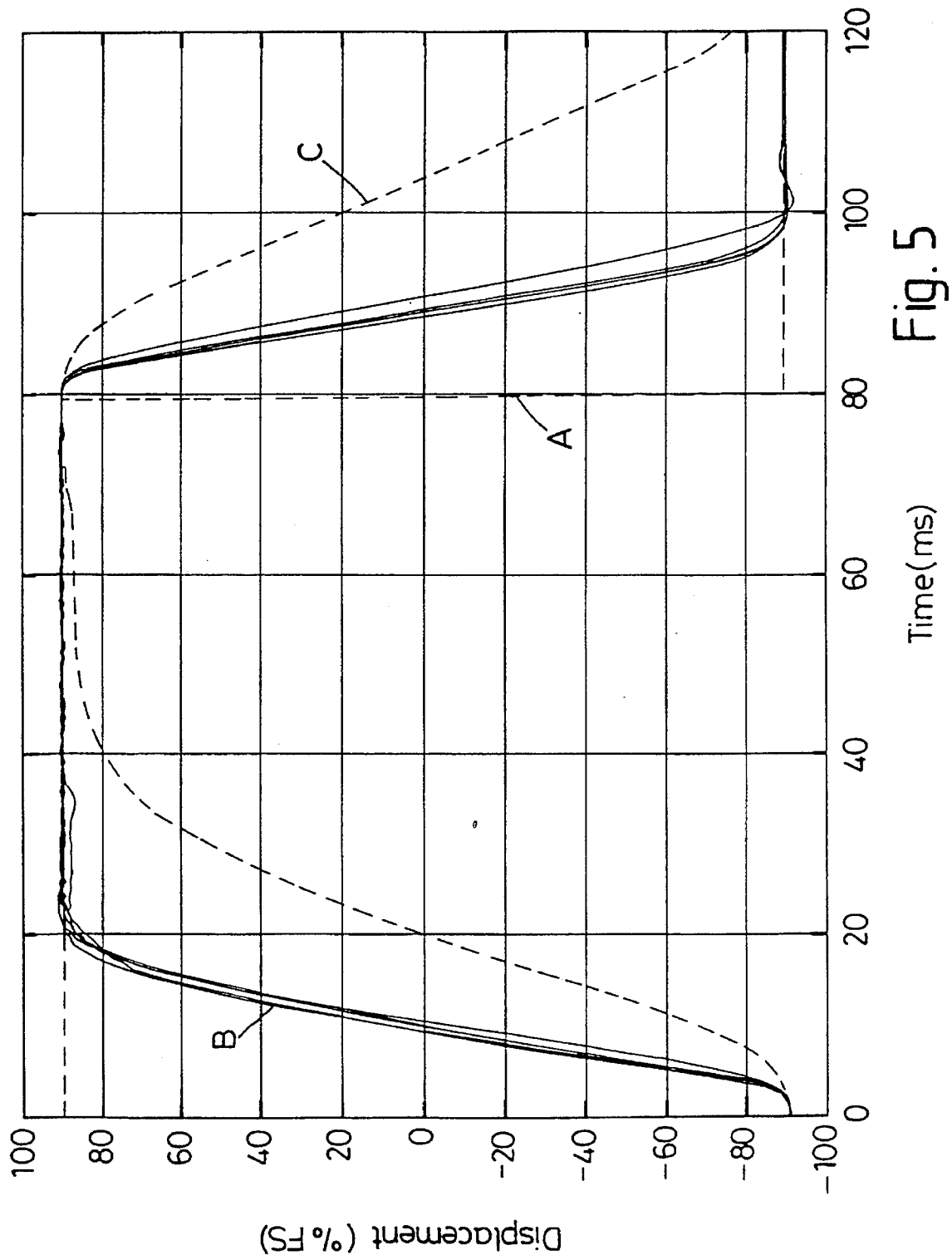
FIG. 5 presents a comparison of the step responses of the prior art and the present invention.

An example of the improved step response of the two stage valve controlled in accordance with the present invention is shown in FIG. 5. The step command signal is referenced A and the corresponding response of a system in accordance with the present invention at various pressures 200, 140, 100, 70 and 30 bar is generally referenced B. The corresponding response at 40 bar of a prior art system using a pressure regulator is referenced C. It may thus be seen that with respect to the prior art system using a pressure regulator, the step response of the present invention exhibits much sharper rising and falling edges, and is thereby capable of operating at significantly higher frequencies.

Thus, with only the provision of a novel control scheme the present invention is able to improve significantly the dynamic response of the main stage spool over a wide range of supply pressures in comparison with the conventional arrangement, the invention thus affording a significant advance in the art.

We claim:

1. A method for controlling a two-stage valve (10), having a pilot stage in the form of a spool valve and a main stage in the form of a spool valve, using a closed-loop control system, the system including a variable gain element, the method involving continually performing the steps:

of estimating the flow gain of the pilot stage of the valve;

comparing the estimated flow gain with a reference flow gain; and in response to said comparison step, adjusting the gain of the variable gain element to maintain a substantially constant closed-loop gain.

2. A method according to claim 1, wherein the step of estimating the flow gain of the pilot stage of the valve includes the measurement of the positions of the spools of the main and pilot valves.

3. A method according to claim 2, including providing a recursive least squares estimator, using said measured spool positions as input signals to calculate the estimated flow gain.

4. A method according to claim 3, including prefiltering signals in order to remove offset errors and high frequency noise.

5. Apparatus for controlling a two-stage valve, having a pilot stage in the form of a spool valve and a main stage in the form of a spool valve, the apparatus including a variable gain element; a means for estimating the flow gain of the pilot stage; comparison means for comparing the estimated flow gain with a reference flow gain; and adjustment means responsive to the comparison means for adjusting the gain of the variable gain element to nullify the effects of the variations in pilot stage supply pressure on the flow gain of the pilot stage.

6. Apparatus according to claim 5, wherein the means for estimating the flow gain of the pilot stage is responsive to the positions of the spools of the main and pilot stage valves.

7. Apparatus according to any of claims 5 and further comprising filter means for filtering the input signals to the estimating means.

8. Apparatus according to claim 5, wherein the apparatus comprises two nested feedback loops comprising an inner loop responsive to measured and desired positions of the spool of the pilot stage valve, and an outer loop responsive to measured and desired positions of the spool of the main stage valve.

9. Apparatus for controlling a two-stage valve, having a pilot stage and a main stage, the apparatus including a variable gain element; a means for estimating the flow gain of the pilot stage; comparison means for comparing the estimated flow gain with a reference flow gain; and adjustment means responsive to the comparison means for adjusting the gain of the variable gain element to nullify the effects of the variations in pilot stage supply pressure on the flow gain of the pilot stage, said means for estimating the flow gain of the pilot stage being in the form of a recursive least squares estimator.

* * * * *